Feb. 1, 1938.  C. A. CLARY  2,106,995
HEADLIGHT
Filed Nov. 5, 1935
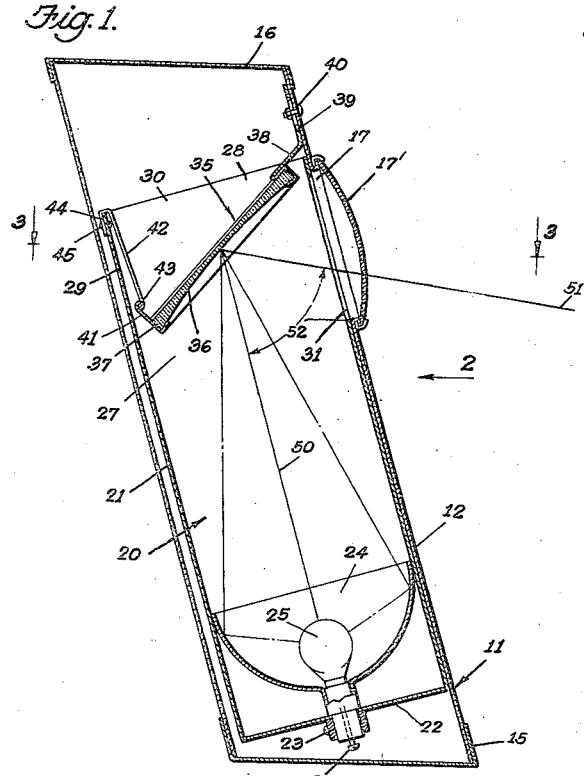
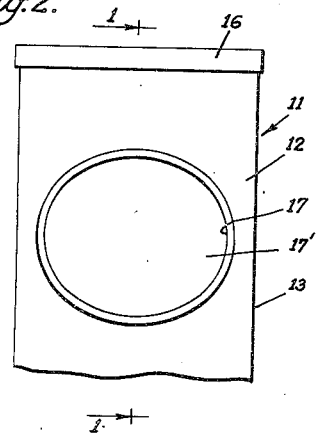
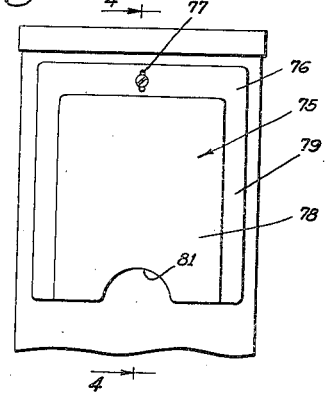
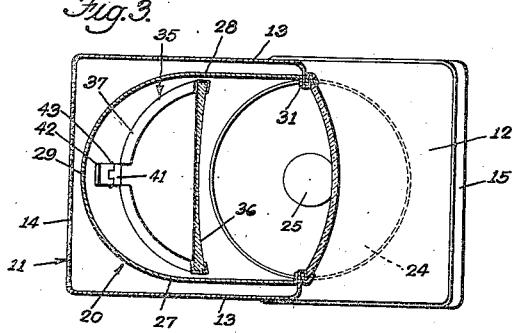
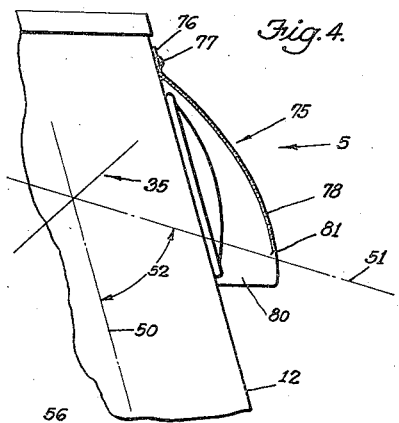
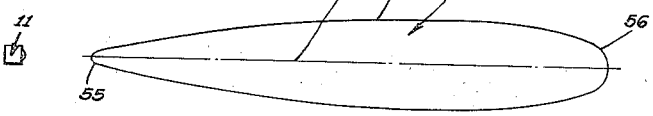
Inventor
C. A. Clary
by Hazard and Miller
Attorneys.

UNITED STATES PATENT OFFICE 2,106,995

HEADLIGHT

Charles A. Clary, Los Angeles, Calif., assignor of one-half to Charles A. Clary, Jr., and Pauline Baker, both of Los Angeles, Calif.

Application November 5, 1935, Serial No. 48,327

1 Claim. (Cl. 240—41.1)

My invention is designated as a headlight suitable for automobiles, but by my invention I may construct lights suitable for illuminating road surfaces or aeroplane fields or the like in such a manner that there is no direct glare from the source of light or the immediate reflection of such light in the eyes of an observer.

An object and feature of my invention is to cause an illumination of an area on the ground, such as a roadway, by reflecting light, using a magnifying type of mirror, such as a concave mirror, so positioned relative to the source of light that the principal reflected light is directed downwardly on the surface of the ground. A more specific object and feature of my invention is a construction by which the principal mirror of the magnifying type is located at an angle behind a window in a suitable lamp housing, which housing preferably extends downwardly a considerable distance below both the window and the principal mirror, in order to place the lamp globe forming the source of light a desired distance below the magnifying mirror. The source of light with the primary reflector is thus positioned so that the light from the lamp globe and the primary mirror is brought somewhat to a focus on the center of the secondary reflecting mirror. The angle of the optical axis of the light from the lamp globe, this being the incident ray of light, forms preferably an acute angle with the reflected light from the main mirror. Therefore, by properly positioning the lamp housing and the axis of the incident beam the reflected light may be projected on the road surface and form an illuminated area. The angle of the reflected beam may be regulated so that there is no glare in the eyes of an observer unless he approaches quite close to the window and his eye is located below the horizontal line of the projection of light through the window. Therefore, with headlights at the usual height above the ground an observer, either, for instance, a pedestrian or parties in an approaching vehicle, do not have any direct glare of light from the lamp globe or the reflector immediately associated with the globe.

By my construction in order to develop an acute angle between the incident and the reflected light from the mirror, it is desirable to have the lamp housing sloping upwardly and rearwardly relative to the direction of light beam on the road. Therefore the incident ray of light is inclined rearwardly in reference to the vertical, and the reflected light beam to illuminate the road is inclined downwardly in reference to the horizontal.

Another object and feature of my invention is a lamp construction by which a secondary illumination is secured by the diffused reflection of light from the inside of the lamp housing from the magnifying concave mirror. This secondary light may be considered as projected in somewhat divergent rays and is considerably diffused and has no image of the illuminating filament of the lamp globe, the globe itself or the first reflector associated with the globe. This secondary light thus is of the non-glare type, and a pedestrian or driver of a vehicle is not inconvenienced by any glare from the secondary diffused light, but such light shows, when my device is used as a headlight, the position of the vehicle on the road even if the illumination from my headlights on the road is not clearly visible to a pedestrian or the driver of an approaching vehicle.

A further detailed object of my invention consists of being able to regulate the character and to a certain extent the color of the secondary light reflected from the walls of the lamp housing by controlling or changing the color of such walls. Thus by having a suitable color defined on the inside walls of the lamp housing I may cause the secondary light to have a similar tinge, whereas the main road surface illuminating light will be a white light from the lamp globe and the first reflector used therewith, such first reflector may be of an ordinary type such as used with so-called spot lights, and the lamp so mounted in the first reflector that the focus may be adjusted to secure the desired road illumination.

Another object and feature of my invention where it is desired to eliminate the secondary light, for instance, in illuminating aeroplane landing fields, is in having a cover screen extending partly over the upper portion of the window of the lamp housing, such a screen may have a semicircular or similar cutout section at the bottom to allow projection of the primary illuminating light derived from the main reflection of the light from the lamp globe and from the first reflector. With this type of screen, the ground or roadway is illuminated, but the source of light is hardly visible.

Another object and feature of my invention is by the design of the shape of the main reflector and the window to control the shape of the illuminated area on the road, for instance, by using a circular concave magnifying mirror having a spherical concave grinding and using a circular window with the illumination by a single lamp globe having an ordinary type of concave first reflector, I secure an illuminated area on the ground which forms, in effect, an ellipse with the long axis of the ellipse in the direction of the projected light with this character of illumination on the ground. If the illuminated area is intersected by a vertical surface such as a wall, the illumination on the wall is substantially a semicircle with the diametrical axis on the ground level and the vertical radius of the curve of illumination being in the plane of the long axis of the ellipse of the ground area of illumination. Thus with this type of illumination shining on an intersecting surface such as a wall, at right angles to the direction of the projected light, the highest point of illumination is directly in the line of the axis of the projected light beam, and this slopes downwardly in a curve approximating a circle to the ground, merging with the portion of the elliptical illuminated area of the road.

The advantage of developing this type of elliptical area of illumination of a road and somewhat semi-circular illumination of objects intersecting the ellipse, is that vehicles or pedestrians at the side of the ellipse are in a low part of the vertical area of illumination. Hence, even if the light is so adjusted to have a long distance projection ahead of the vehicle, pedestrians or approaching vehicles on a path parallel to that of the vehicle carrying my headlight are not subjected to a glare of light, whereas objects directly in the line of the projected light from the headlight will be fully illuminated.

Manifestly the ordinary vehicle would be equipped with two similar headlights, each presenting its own elliptical area of illumination on the ground, these areas overlapping and thus producing an intense sector of brilliant illumination in the center of the road, the outside marginal portions of the two elliptical areas giving sufficient illumination on the side of the road to see curbs, ditches and approaching vehicles or pedestrians.

A characteristic of my invention is that the direct and brilliant rays of light from the lamp and its reflector are focused downwardly on a horizontal road surface by the magnifying mirror. This focus may be changed and adjusted slightly to produce the brilliant area of illumination on the road surface. Also, when the magnifying mirror is observed at positions above the optical axis of the reflected light which illuminates the road area, presents the appearance of being an illuminated object. While this has a brilliant illumination, this secondary light does not give a glare but quite clearly indicates to pedestrians and drivers, the approach and position of a vehicle having my headlight.

My invention is illustrated in connection with the accompanying drawing, in which Fig. 1 is a vertical section on the line 1—1 of Fig. 2 in the direction of the arrows, showing one form of my invention;

Fig. 2 is a front elevation taken in the direction of arrow 2 of Fig. 1;

Fig. 3 is a horizontal section on the line 3—3 of Fig. 1 in the direction of the arrows;

Fig. 4 is a partial section similar to Fig. 1, showing a modification with the cover screen for the window glass, such section being substantially on the line 4—4 of Fig. 5;

Fig. 5 is a front elevation taken in the direction of the arrow 5 of Fig. 4;

Fig. 6 is a diagram in plane showing the form of road illumination;

Fig. 7 is a diagram in partial perspective showing the form of illumination of a road and intersecting object.

In constructing my invention I preferably make use of a tubular lamp housing 11 which on the front 12 may be made of suitable shape to conform to the front of a vehicle, and in the illustrations these are shown as substantially flat, the sides 13 are also flat, and there may be a rear wall 14, if desired. This latter, of course, would depend on the design of vehicle for which my headlight is used. For instance, the headlight may be installed immediately rearwardly of the sloping front wall 12, and the side walls 13 would not be necessary. The outer housing 11 has a closure cap 15 at the bottom, and a second closure cap 16 at the top. It is provided with a window opening 17 in the front, this being on a slope, and in this opening there is fitted a glass window 17'. This window has no light refracting or distorting properties, that is, there are no prisms or lenses corporated with this window to distort the direction of light.

Located inside of the housing 11 there is a lamp and reflector mounting shell 20. This preferably has the lower portion 21 circular in cross section, and has a circular base 22 with a socket 23, to which is connected a primary reflector 24. This reflector may be of the usual type such as a spherical reflector, and in this reflector secure in the socket there is a lamp globe 25. This may be adjusted in a suitable way by a screw 26 to bring the filament of the lamp in a focal position of the primary reflector 24.

The upper portion 27 of the shell 20 is deformed from the circular and has somewhat flattened sides 28 with a circular rear portion 29. This shell is open at the top, having an upper edge 30 and is provided with an opening 31 corresponding in size to the opening 17 forming the window.

The secondary reflector 35 has a spherical curvature 36 and is mounted in a frame 37 of a substantial character. At the forward edge of the frame there is a bracket 38 with a tongue 39 having a series of perforations or a slot so that it may be adjusted in relation to the front wall 12 of the outer lamp housing 11, the adjustments being secured by bolts 40.

The rear edge of the mirror frame 37 has a strap 41 connected thereto to which is attached a link 42 by hinged connection 43, this link having a hook 44 at its upper end, this hook being looped over the edge 30 of the inner shell 20. By this mounting of the main reflector 35, adjustment may be made to secure the desired direction of reflection of the light from the lamp from the reflector 24, and from the inside surfaces of the inner shell 20. The hook 44 is secured by a rivet or the like 45, thus the mirror 35, when once adjusted, is rigidly and firmly supported in the lamp housing or shell to give the desired projection of light.

The principal road illuminating light may be considered as having an incident light ray 50 from the lamp globe 25. This light ray 50 also is the axis of the light reflected by the first reflector 24. The axis of the reflected light 51 from the mirror 35 is inclined downwardly in reference to the horizontal. It will be noted that the incident ray 50 is inclined rearwardly in regard to the vertical. Therefore, a characteristic of my invention is that the angle 52 between the axis of the incident and the axis of the reflected light rays is an acute angle, thus causing the reflected light to be projected downwardly on the ground or road surface to be illuminated.

This type of illumination when I use a circular first mirror 24 and a circular magnifying mirror 35 and also a circular window 17, is to give an illuminated light area indicated at 53 (note Figs. 6 and 7). In Fig. 6, it is presumed that the light is directed on a road surface in which it will be seen that the illuminated area is somewhat elliptical or oval with the long axis 54 in the direction of projection of the light. The end 55 of the illuminated area may be located quite close to the headlight in order to illuminate the road close to the vehicle, and the remote portion 56 may be a considerable distance from the vehicle, depending on the angle the axis of reflected light 51 makes with the road surface.

Where the illuminated area is intersected by some object, illustrated in Fig. 7 as a wall 57, the area of illumination 58 on this wall conforms somewhat to a half-circle with the diameter 59 of this circle representing the transverse measurement of the oval or ellipse of road illumination intersecting the wall. A vertical height 60, therefore, of the illumination of the wall is substantially a radius, that is, one-half the measurement distance 59. Thus the line of illumination 61 on the wall conforms somewhat to a circle. Therefore, along the marginal edges 62 of the illuminated patch on the ground the height of illumination above the ground is quite low and this increases in height towards the center of the long axis 54 of the illumination. Therefore, presuming two vehicles are approaching, or a vehicle with my headlights is approaching a pedestrian, if the other vehicle or pedestrian are at the side of the illuminated patch or adjacent thereto, the area of illumination will not rise sufficiently high to cause a glare to an opposing driver or pedestrian. However, if the pedestrian or other vehicle be somewhat near the axis 54 of illumination they will be in the full path of the light, depending on their distance from the headlight, and thus be properly illuminated.

It will be apparent that where two headlights are used as is common in automobiles, that the ellipses or ovals 53 will overlap, each having its own long axis of projection, and thus at the overlap there will be a more brilliant illumination, this being in the center of the axial line of the vehicle. Hence, by proper adjustment of the headlights a brilliant illumination of the road surface will be obtained and sufficient lateral illumination to properly light curbs, ditches, or objects on the side of the road.

Another characteristic feature of my invention relates to a secondary reflection of light from the mirror 35. These are composed mainly of the diffused light from the inside walls of the shell 20, that is from the lower part 21 and the upper part 27. These rays may be considered diverging, but as they are above the axial line of projection of the light from the lamp globe 25 and the reflection of this globe in the mirror 24 these secondary rays do not have any glare. The character and color of these secondary rays is dependent to a great extent on the inside surface of the shell 20. For instance, this shell may be painted or given different colors, and the secondary rays will have a tint corresponding to the color of the inside walls of the shell, whereas the light projected from the lamp globe 25 and the reflector 24 along the axis 51 will be a brilliantly white light. Manifestly, therefore, by arranging the character and color of the inside surface of the shell 20 between the reflectors 24 and 35 a certain characteristic of color may be given to the secondary rays. While these rays have very little intensity for illuminating objects, they are sufficiently bright to show to an observer that a vehicle is approaching where my invention is used for a headlight, and also where two headlights are used an observer can detect the angle of the approaching vehicle altho said person may not be able to see the illumination on the road caused by the reflected rays 51.

It is quite often the case in driving vehicles that a person cannot see the illumination caused on the road by approaching vehicles on account of being blinded to a certain extent by the glare of approaching headlights, but with my invention these rays of the divergent secondary illumination do not produce a glare in the eyes of an approaching driver so that such driver is in many cases able to see the illumination on the road caused by a vehicle having my headlights, and therefore by seeing the illuminated area on the road as well as a secondary light a better clearance can be obtained for passing vehicles.

In the modification of Figs. 4 and 5, a cover screen 75 is used. This has an upper portion 76 adjustably attached to the front wall 12 of the lamp housing by, for instance, a screw and slot adjustment 77. The front portion 78 is preferably arched outwardly from the window 17, having side portions 79 contacting with the front 12 of the lamp housing, thus forming a screen open on the bottom 80. The front portion preferably has a semi-circular notched out section 81, this being of sufficient amount to accommodate the cone of light projected along the axis 51 of the reflected area. With this screen the secondary light is cut off and the road surface illuminated by the light reflected by the mirror 24 from the lamp globe. This type of illumination is quite suitable for aeroplane landing fields or the like, in which it is desirable to have a ground illumination without the source of light being visible, for, on account of using this screen, the secondary rays being entirely screened off, the source of light is hardly visible. Hence, by having a proper number of lights of this character distributed along the sides of aeroplane landing fields a desirable ground illumination may be obtained.

Various changes may be made in the principles of my invention without departing from the spirit thereof as defined by the appended claim.

I claim:

A headlight having a housing with a shell, the housing and the shell each having a window opening, a primary reflector having a concave reflecting surface mounted in the base of the shell, an illuminating lamp positioned relative to the reflector to have the light therefrom reflected to a focus, the secondary mirror having a concave reflecting surface of greater radius of curvature than the radius of the primary reflector, said secondary mirror being mounted in a frame, a link connecting one side of the frame to the shell, a bracket attached to a substantially opposite side of the frame and having a tongue, the tongue having an adjustable connection to the housing, the shell, the reflector and the mirror being positioned whereby the optical axis of an incident ray on the secondary mirror from the lamp and the primary reflector and the optical axis of the reflected ray from the secondary mirror form an acute angle and also whereby the optical axis of reflected ray is inclined downwardly relatively to the horizontal, the illumination from the said lamp being adapted to project a cone of light rays adapted to form on a horizontal road surface located below the primary reflector substantially oval in outline with the long axis of the plane of the optical axes of the said incident and reflected rays, the distance between the primary reflector and the mirror being such that secondary unfocused light rays from the primary reflector and from the inside of the shell illuminate the secondary mirror whereby the secondary illumination from the said mirror appears to an observer having his eyes outside of the cone of rays forming the elliptical pattern, as a non-glare illumination.

CHARLES A. CLARY.